United States Patent
Galic et al.

(10) Patent No.: US 8,526,732 B2
(45) Date of Patent: Sep. 3, 2013

(54) TEXT ENHANCEMENT OF A TEXTUAL IMAGE UNDERGOING OPTICAL CHARACTER RECOGNITION

(75) Inventors: Sasa Galic, Seattle, WA (US); Djordje Nijemcevic, Beograd (RS); Bodin Dresevic, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/720,732

(22) Filed: Mar. 10, 2010

(65) Prior Publication Data

US 2011/0222768 A1 Sep. 15, 2011

(51) Int. Cl.
*G06K 9/00* (2006.01)
(52) U.S. Cl.
USPC ........................................................... 382/170
(58) Field of Classification Search
USPC .................................. 382/168–172, 176–180
See application file for complete search history.

(56) References Cited

U.S. PATENT DOCUMENTS

| | | | |
|---|---|---|---|
| 5,513,304 A | 4/1996 | Spitz et al. | |
| 5,915,039 A | 6/1999 | Lorie et al. | |
| 6,301,386 B1 * | 10/2001 | Zhu et al. | 382/176 |
| 8,086,050 B2 * | 12/2011 | Schwartz et al. | 382/232 |
| 8,320,674 B2 * | 11/2012 | Guillou et al. | 382/179 |
| 2003/0198386 A1 | 10/2003 | Luo | |
| 2006/0098239 A1 | 5/2006 | Wang et al. | |
| 2007/0269139 A1 | 11/2007 | Erol et al. | |
| 2008/0002914 A1 | 1/2008 | Vincent et al. | |

FOREIGN PATENT DOCUMENTS

| | | |
|---|---|---|
| JP | 2008-187327 A | 8/2008 |
| KR | 10-1997-0002420 B1 | 11/1994 |
| KR | 10-0480024 B1 | 8/2005 |

OTHER PUBLICATIONS

Ali, Majdi Ben Hadj, "Background Noise Detection and Cleaning in Document Images", Retrieved at<<http://ieeexplore.ieee.org/stamp/stamp.jsp?tp=&arnumber=547270&isnumber=11504>>, Proceedings of the International Conference on Pattern Recognition (ICPR '96) vol. III-vol. 7276, Aug. 25-29, 1996, pp. 758-762.

Author Unknown, "ABBYY FineReader OCR Professional 10.0.101.56", Retrieved at<<http://www.filecluster.com/Business-Office/Office-Suites-Tools/Download-ABBYY-FineReader-OCR-Professional.html>>, Dec. 17, 2007, p. 1.

* cited by examiner

*Primary Examiner* — Vikkram Bali (57) ABSTRACT

A method for enhancing a textual image for undergoing optical character recognition begins by receiving an image that includes native lines of text. A background line profile is determined which represents an average background intensity along the native lines in the image. Likewise, a foreground line profile is determined which represents an average foreground background intensity along the native lines in the image. The pixels in the image are assigned to either a background or foreground portion of the image based at least in part on the background line profile and the foreground line profile. The intensity of the pixels designated to the background portion of the image is adjusted to a maximum brightness so as to represent a portion of the image that does not include text.

17 Claims, 9 Drawing Sheets

FIG. 1

FIG. 2
(Sample Text)

FIG. 3
(Gray Scale Text on White Background)

FIG. 4
(Dark Background Transformation)

FIG. 5
(Textual Line Representation in the Edge Space)

FIG. 6
(Gray-scale Version of Text Image)

FIG. 7
(Piece of Native Line)

FIG. 8
(Piece of Native Line in Edge Space)

FIG. 9
(Piece of Native Line in Edge Space)

FIG. 10
(Histograms)

FIG. 11
(Line Profiles)

FIG. 12
(Image Inversions)

FIG. 13
(Low Quality Text Image)

FIG. 14
(Thresholding Result on Low Quality Text Image)

FIG. 15
(Stroke Width Computation for the Single Foreground Pixel)

FIG. 16
(Image Interpolation)

FIG. 17
(Interpolation Steps)

FIG. 18
(Text Image Interpolation)

FIG. 19
(Text Image with Decreased Color Resolution)

FIG. 20
(Pixel Adding Procedure)

FIG. 21
(Skeleton Illustration)

FIG. 22
(Letter Skeletons)

FIG. 23
(Enhanced Text)

TEXT ENHANCEMENT OF A TEXTUAL IMAGE UNDERGOING OPTICAL CHARACTER RECOGNITION

BACKGROUND

Optical character recognition (OCR) is a computer-based translation of an image of text into digital form as machine-editable text, generally in a standard encoding scheme. This process eliminates the need to manually type the document into the computer system. A number of different problems can arise due to poor image quality, imperfections caused by the scanning process, and the like. For example, a conventional OCR engine may be coupled to a flatbed scanner which scans a page of text. Because the page is placed flush against a scanning face of the scanner, an image generated by the scanner typically exhibits even contrast and illumination, reduced skew and distortion, and high resolution. Thus, the OCR engine can easily translate the text in the image into the machine-editable text. However, when the image is of a lesser quality with regard to contrast, illumination, skew, etc., performance of the OCR engine may be degraded and the processing time may be increased due to processing of all pixels in the image. This may be the case, for instance, when the image is generated by an imager-based scanner, because the text/picture is scanned from a distance, from varying orientations, and in varying illumination. Even if the performance of scanning process is good, the performance of the OCR engine may be degraded when a relatively low quality page of text is being scanned.

SUMMARY

The accuracy of an OCR process can be significantly improved if the background of the original image is detected and filtered out while the remaining text pixels are consolidated. In one implementation, the background is detected and filtered by calculating the background and text color profiles. Text enhancement is them performed using a stroke recovery technique which identifies the text stroke pixels with high accuracy.

In one particular implementation, a method for enhancing a textual image for undergoing optical character recognition begins by receiving an image that includes native lines of text. A background line profile is determined which represents an average background intensity along the native lines in the image. Likewise, a foreground line profile is determined which represents an average foreground background intensity along the native lines in the image. The pixels in the image are assigned to either a background or foreground portion of the image based at least in part on the background line profile and the foreground line profile. The intensity of the pixels designated to the background portion of the image is adjusted to a maximum brightness so as to represent a portion of the image that does not include text.

In yet another particular implementation, an average or median stroke width of the connected components representing text in the image is determined after the background and foreground line profiles have been determined. If the average or median stroke width is less than a threshold value, the text quality is enhanced. For instance, text quality may be enhanced by performing image interpolation to increase image resolution.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10$a$ is histogram of the intensity for the rectangular localized region in FIG. 7;

FIG. 10$b$ is a histogram illustrating the distribution of pixels with respect to their color intensity for the dark gray areas in FIG. 9; FIG. 10$c$ is a histogram obtained by subtracting the values of the second histogram in FIG. 10$b$ from the corresponding values of histogram in FIG. 10$a$.

FIG. 21$a$ shows an example of a connected component; FIG. 21$b$ shows the edge pixels for the connected component in FIG. 21$a$; FIG. 21$c$ shows the skeleton of the connected component in FIG. 21$a$.

DETAILED DESCRIPTION

Figure 1:
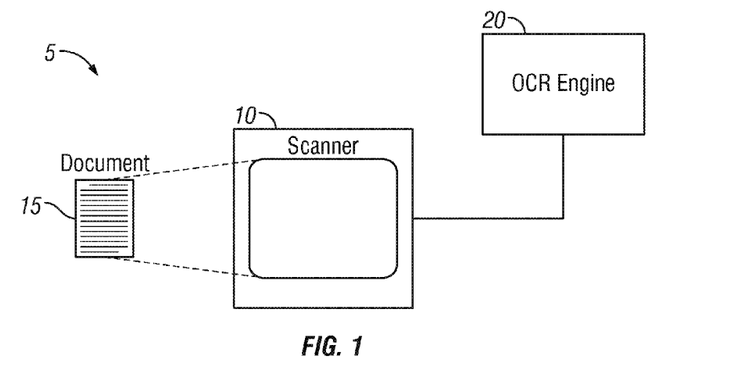
FIG. 1 shows one illustrative example of a system for optical character recognition.

FIG. 1 shows one illustrative example of a system 5 for optical character recognition (OCR) in an image which includes a data capture arrangement (e.g., a scanner 10) that generates an image of a document 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. In this particular example the OCR engine 20 is incorporated into the scanner 10. In other examples, however, the OCR engine 20 may be a separate unit such as stand-alone unit or a unit that is incorporated into another device such as a PC, server, or the like.

The accuracy of an OCR process can be significantly improved if the background of the original image is detected and filtered out while the remaining text pixels are consolidated. As detailed below, the background is detected and filtered by calculating the background and text color profiles. Text enhancement is them performed using a stroke recovery technique which identifies the text stroke pixels with high accuracy.

The input to this text enhancement process is an image of the native lines of text (see below for a definition of "native line"). However, before proceeding to describe the actual process some mathematical concepts will be introduced. These concepts will be generally be used throughout this discussion in order to facilitate an understanding of the invention and, in some cases, to formalize certain explanations.

Definition 1. The digital color image of width w and height h is the vector function of two arguments $\vec{T}:W \times H \rightarrow GS^3$ where $GS=[0,1,\ldots,255]$, $W=[0,1,\ldots,w-1]$, $H=[0,1,\ldots,h-1]$ and x denotes Cartesian product.

This definition is derived from the RGB color system and the components r, g, b in $\vec{T}(r, g, b)$ correspond to red, green and blue components, respectively.

Definition 2. The digital gray-scale image of width W and height H is the scalar function of two arguments $I:W \times H \rightarrow GS$ where GS may be:
- $GS=[g1,g2]$, where the gray-scale image is referred to as binary, bi-level or bi-tonal image
- $GS=[g1, g2, g3, \ldots, g16]$ where the gray-scale image is referred to as 16-level gray-scale image
- $GS=[g1, g2, g3, \ldots, g256]$ where the gray-scale image is referred to as 256-level gray-scale image.

At this point one convention used throughout the document should be introduced. Since the image is considered as a function, the coordinate system of its graphical presentation should be defined. Usually, the top-left corner of the image is taken as a reference point. This convention will be followed herein and therefore the top left corner of the image will be treated as being placed at the origin.

Definition 3. The triplet (I(x, y), x, y) is called a pixel. The pair (x, y) is called the pixel coordinates while I(x, y) is called the pixel value.

Usually, the term "pixel" is used interchangeably for the coordinates, the value, as well as both the coordinates and the value. The term "pixel" will also be used herein in this way if no confusion is likely to arise, otherwise the exact term will be used. Also, the notation I(x, y) will be used interchangeably when no confusion is likely.

The previous three definitions provided an understanding of what the digital image is. The usual task of image processing is the series of transformations that lead to some presentation of the original image that is more convenient for further analysis so that various conclusions may be drawn. The following definitions provide the mathematical means for the formalization of these transforms.

Definition 4. Let $\Omega$ be a set of all images with dimensions w and h. The function $T:\Omega^n \rightarrow \Omega$ is called the n-ary image operator. If n=1 the operator is unary, while for n=2 the operator is binary.

The previous definition implies that the operator is a function that transforms an image (or several images) into another image using some set of transformation rules. The most important image operators are filter-based operators. The filter (sometimes called the kernel or mask) is the matrix $A_{nm}$.

$$\begin{bmatrix} a_{11} & a_{12} & \ldots & a_{1m} \\ a_{21} & a_{22} & \ldots & a_{2m} \\ \ldots & \ldots & & \ldots \\ a_{n1} & a_{n2} & \ldots & a_{nm} \end{bmatrix}$$

of n×m size. Usually n and m are equal and odd, yielding, for instance, 3×3, 5×5, 7×7 filters. The filter-based operator transforms an input image using the rule that the pixel $I_o(x, y)$ in the output image is calculated using formula:

$$I_0(x, y) = \sum_{i=1}^{n} \sum_{j=1}^{m} a_{ij} I\left(x - \frac{n}{2} + i - 1, y - \frac{m}{2} + j - 1\right)$$

where all divisions are integer divisions.

In other words the pixel in the output image is constructed by convolving the neighborhood of the corresponding pixel in the input image with the filter.

Definition 5. Let I be an image of width w and height h, and let I(x, y) be an arbitrary pixel. The set of pixels $\{I(x+1, y), I(x-1, y), I(x, y+1), I(x, y-1)\}$ is called the 4-neighbors of I(x, y). Similarly, the set of pixels $\{I(x+1, y), I(x-1, y), I(x, y+1), I(x, y-1), I(x-1, y-1), I(x-1, y+1), I(x+1, y-1), I(x+1, y+1)\}$ is called 8-neighbors of I(x, y).

There are different definitions of adjacency in the literature, but the following definition will be used since it is the most convenient for the subsequent discussion.

Definition 6. Two pixels $I(x_1, y_1)$ and $I(x_2, y_2)$ are adjacent if $I(x_2, y_2)$ is the member of 8-neighbors set of $I(x_1, y_1)$ and their pixel values are "similar".

The word similar is placed in quotes because no strict definition of similarity exists. Rather, this definition is adopted according to the demands of a particular application. For example, it may be said that two pixels are similar if their pixel values are same. Throughout the document this definition will be assumed, if not stated otherwise.

Definition 7. Two pixels $I(x_1, y_1)$ and $I(x_n, y_n)$ are connected if the set $\{I(x_2, y_2), I(x_3, y_3), \ldots, I(x_{n-1}, y_{n-1})\}$ exists, such that $I(x_i, y_i)$ and $I(x_{i+1}, y_{i+1})$ are adjacent for i=1, 2, ..., n-1.

Definition 8. A connected component is the subset of image pixels where each pixel from the set is connected with all remaining pixels from the set.

In order to filter the background in a text image, the relationship between the text and the background needs to be understood in order to provide gray scale text on a clean (e.g., white) background. This requirement can be made clear with reference to FIG. 1.

Figure 2:
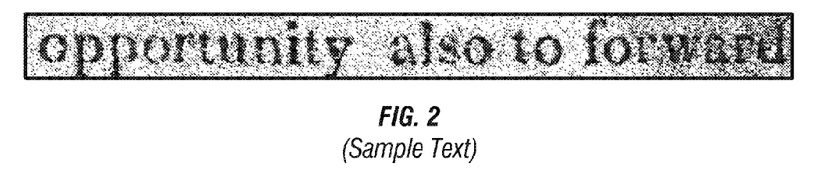
FIG. 2 shows an example of a textual line that is not suitable for processing.

The image of the textual line depicted in FIG. 2 is not suitable for successive processing. If it could be transformed into the image shown in FIG. 3 the subsequent steps in the OCR process likely would be simpler and more accurate. Furthermore, it is convenient to assume that the text is darker than the background. If this is in fact the case, then all text-background combinations may be uniformly handled. Accordingly, when necessary the image transformation depicted in FIG. 4 should be performed.

The previous discussion should make clear that in order to filter the background of a textual image, the text-background relationship (in terms of color) should be determined and that the text enhancement process produces an image in which dark text is presented on a white background. In the following section the text-background relationship detection is described.

Line Profiling

The first thing to note is that a textual line image has two types of pixels, one originating from text and one originating from background. Also, there is a sudden color change at the edge between the text and background. This leads to the conclusion that a text line may be observed in edge space. A line representation in edge space may be obtained using any of a variety of well-known edge detection techniques. An example of a line representation in edge space is shown in FIG. 5.

Figure 5:
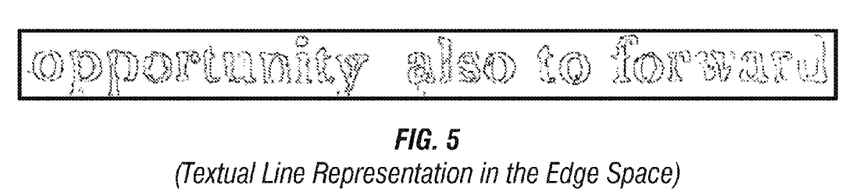
FIG. 5 shows an example of a text line representation in edge space.

It is clear that all the important text features are preserved in FIG. 5. The letters are primarily represented as connected components in edge space. Furthermore, the presentation of textual features in edge space is independent of the text-background relationship (e.g. it is irrelevant which one is darker). Therefore, the following definition can be formulated.

Definition 9. The native line is a set of all connected components in the edge space of the textual line image.

If $CC_i$ is i-th connected component and nl is a native line then it holds:

$$nl = \{CC_1, CC_2, \ldots, CC_n\}$$

The line profiling procedure is undertaken on the native line producing line profiles defined in the following definition.

Definition 10. Let nl be a native line and let $I(x, y)$; $x \in \{0, 1, \ldots, w-1\}$ $y \in \{0, 1, \ldots, h-1\}$ be the corresponding native line image with width w and height h. Then the functions $FLF_{nl}: W \to GS$ and $BLF_{nl}: W \to GS$ where $W = \{0, 1, \ldots, w-1\}$ and $GS = \{0, 1, \ldots, 255\}$ are called the foreground line profile and background line profile if the following conditions are satisfied:

$$FLP_{nl}(x_0) = \frac{\sum_{j=0}^{h-1} I(x_0, j)|_{I(x_0, j) \in FP(x_0)}}{card(FP(x_0))}$$

$$BLP_{nl}(x_0) = \frac{\sum_{j=0}^{h-1} I(x_0, j)|_{I(x_0, j) \in BP(x_0)}}{card(BP(x_0))}$$

where $FP(x_0)$ is the set of all foreground pixels from the native line image with coordinate $x = x_0$ and $BP(x_0)$ is the set of all background pixels from the native line image with coordinate $x = x_0$.

In other words, the profile functions reflect the average background or foreground intensity for a given image column.

Figure 6:
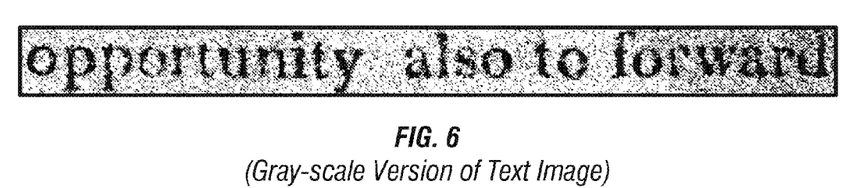
FIG. 6 is a gray scale version of the image in FIG. 2.

The importance of introducing line profiles should be clear after consulting FIG. 6, which is a gray scale version of the image in FIG. 2. Although it is often a reasonable assumption that the text color intensity and background color intensity are fairly uniform along the horizontal axis, this assumption fails in the case of FIG. 6. The average background intensity on the left side of the image is around 190 while on the right side of the image it is around 100 (the difference is more than one third of the entire gray-scale range 0-255).

Thus, in the case of FIG. 6, approximating the background intensity with a single value across the entire image would produce significant loss in precision, preventing subsequent processing steps from obtaining the most reliable information. This is the reason for introducing the line profiles. The line profiling procedure is a method for estimating the line profiles and will be described below.

The line profiles introduced in definition 10 are difficult to compute using the given formulas due to a lack of knowledge about the foreground and background pixels at this point in the process. Therefore, some kind of estimation should be performed.

The first thing to observe is that, although a large variation in color may be present in the entire native line, over a relatively small localized region the color should be fairly constant. If that localized region is selected to be, for example, a rectangle with a width equal to several multiples of h and a height equal to h (where h is the height of the line), then local processing may be performed on that small portion.

The dimensions of the rectangle are chosen to be compliant with the assumption that the color variation cannot be relatively large over a distance proportional to the width of a few characters. Local processing implies that the processing performed on the rectangle yields two values; one for the dominant background color and one for the dominant foreground color. These two results may be used to approximate the line profile values over the corresponding rectangle. An example of one such rectangle is depicted in FIG. 7.

Figure 7:
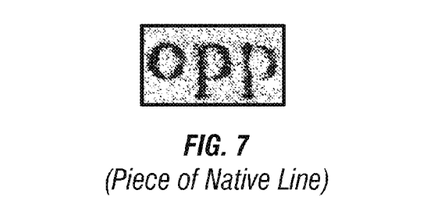
FIG. 7 shows the left-most part of the native line in FIG. 6 in which local processing is performed over a rectangle having dimensions 2*h×h.

FIG. 7 shows the left-most part of the native line in FIG. 6 in which the selected rectangle has dimensions 2*h×h. If local processing yields df and db as the dominant foreground and background colors, respectively, then the following approximation may be used:

$$FLP_{nl}(x) \approx df; x = \{0, 1, \ldots, 2*h\}$$

$$BLP_{nl}(x) \approx bf; x = \{0, 1, \ldots, 2*h\}$$

Figure 8:
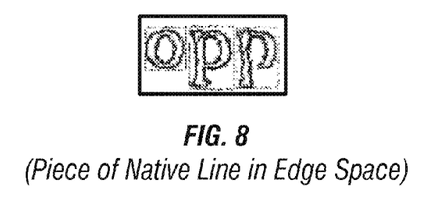
FIG. 8 shows the native line in FIG. 7 represented in edge space.

This approximation gives rise to a step-like approximation for the line profile. In order to compute the values of df and db, the rectangle in FIG. 7 should be represented in edge space, as depicted in FIG. 8. Other approximations may be used as well. For example, the piecewise linear approximation may give better results, although it may require increased processing time.

Figure 9:
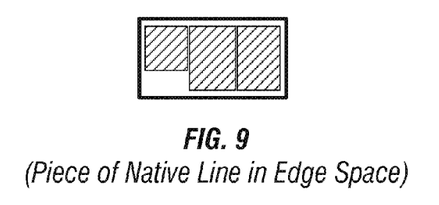
FIG. 9 shows boxes surrounding the connected components shown in FIG. 8 which define one area (dark) containing the edges and another one (light) not containing edges.

The three inner rectangles in FIG. 8 correspond to the bounding boxes of the connected components. These boxes define two different areas, one containing the edges and another one not containing edges. These areas are illustrated in FIG. 9. The dark grey areas in FIG. 9 correspond to edge areas while the light gray areas correspond to non-edge areas.

Next, a histogram is computed illustrating the distribution of pixels with respect to their color intensity for the rectangular localized region in FIG. 7. Another histogram is computed illustrating the distribution of pixels with respect to their color intensity only for the dark gray areas in FIG. 9. Yet another histogram is obtained by subtracting the values of the second histogram from the corresponding values of first histogram. The computed histograms are shown in FIGS. 10a, 10b and 10c.

Figure 10:
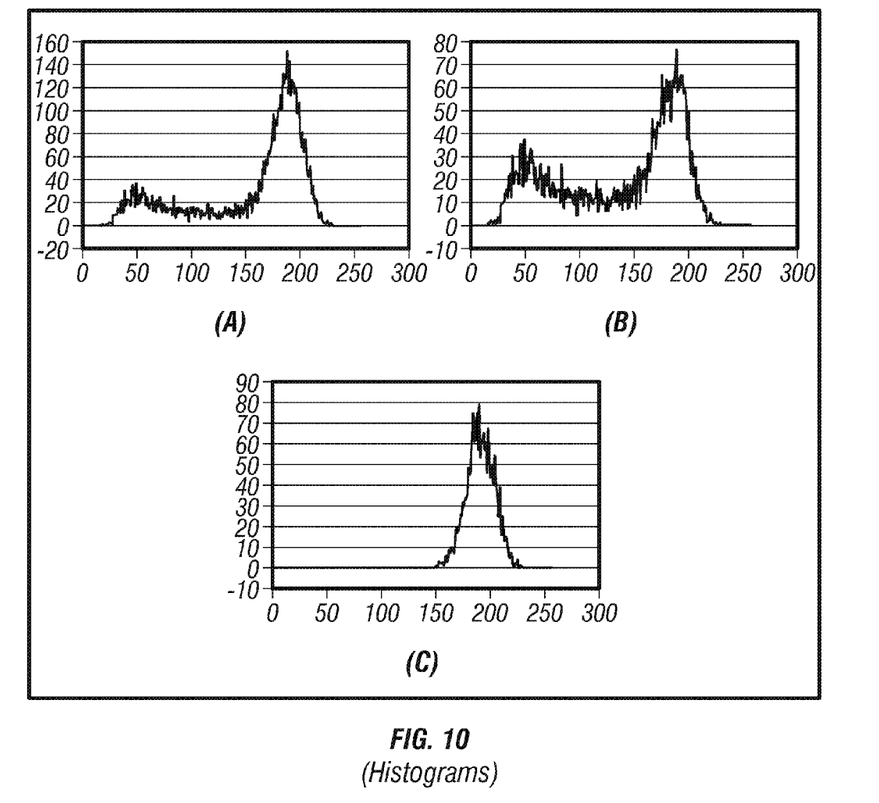

The histogram in the FIG. 10c is the histogram of the light gray area in FIG. 9 (this is because it was created by the subtraction process mentioned above). This is the area that does not include edges, which implies the area with no letters since edges are found only at a letter-background boundary.

In other words, it is the area corresponding to background. This will be demonstrated by discussing the histograms in FIGS. 10a and 10b in greater detail.

The histogram in FIG. 10a represents the distribution of pixel intensity for the entire rectangle in FIG. 7. As shown, there is one dominant peak caused by the background pixels. Strictly speaking, the presence of this dominant peak is not a rule (consider very bolded text), so it will not yet be assumed that this actually represents the background. There is also a relatively flat portion of the histogram to the left of the peak which is caused by text and background, as well as their blending.

The histogram 10b represents the distribution of pixel intensity for pixels within the inner rectangles shown in FIG. 9, which corresponds to the edge area. This histogram appears fairly similar to the one in 10a, except that the background peak is not so dominant. The third histogram (FIG. 10c) is the most important. As noted above, it corresponds to the background pixels. Due to the histogram subtraction process, the components originating from text and text-background blending are completely canceled (note the absence of the flat area from FIG. 10a). The particular bin in the histogram corresponding to the maxima of the peak gives the intensity of the dominant background color. In this example it is 190.

The background dynamic range may also be obtained from the histogram in FIG. 10c. It can be found by examining the intensity starting at 0 and finding the intensity value for the first bin that has a non-zero number of pixels. In FIG. 10c this value is 150. Then the intensity value is found for the subsequent bin in which the number of pixels returns to zero. In FIG. 10c this value is 230. Thus, the dynamic range is [150, 230]. The intensity values in histogram 10b which are outside of this range are caused by foreground text pixels. The bin in the histogram of FIG. 10b corresponding to the maxima value of the secondary peak arising from the foreground pixels corresponds to the intensity of the dominant foreground color, which in this example is 47.

Figure 11:
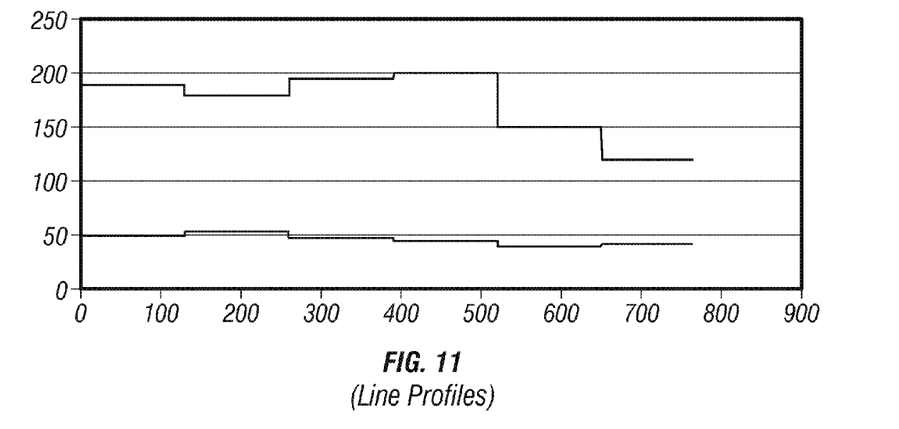
FIG. 11 shows the computed background (upper line) and foreground (lower line) line profiles for the text line in FIG. 6.

Estimates for the foreground and background line profiles can be obtained by applying this process to each localized region (e.g., the rectangle in FIG. 7) of the native line. It should be noted that all the processing needed to obtain these estimates rely on simple histogram manipulation; namely histogram calculation, histogram subtraction and maximal value extraction. No complex operations (e.g., peak detection, peak width estimation, flat areas detection) are performed, thus leaving little opportunity for potential errors to arise from a complex analysis. The computed background and foreground line profiles for the text line in FIG. 6 are depicted in FIG. 11, where the upper line represents the background line profile and the lower line represents the foreground line profile.

One additional step should be performed at this point. Namely, by observing the relationship between the two line profiles, the text-background relationship can be easily extracted to determine which one is darker. If light text is found on a dark background the image inversion operator Inv(I(x, y)) can be applied. This operator is defined as $$Inv(I(x,y)) = 255 - I(x,y)$$

Figure 12:
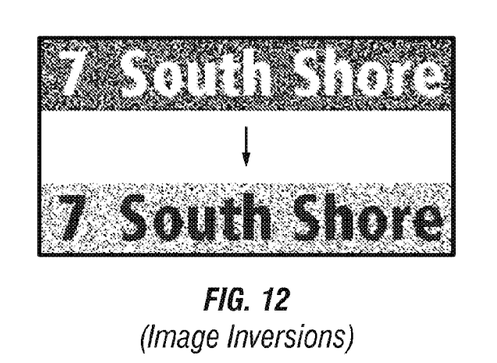
FIG. 12 shows the result of applying the inversion operator to light text on a dark background.

The result of applying this operator is depicted in FIG. 12. After this inversion is performed, when necessary, it may be safely assumed that dark text appears on a light background. Once the background and foreground line profiles have been calculated (and image inversion performed when necessary), the background may be filtered out using thresholding, which will be described below.

Thresholding

Once the line profiles have been calculated the process of filtering the background is fairly straightforward. The function Thresh(I (x, y)):GS→GS is applied to each pixel and is defined as:

$$\text{Thresh}(I(x, y)) = \begin{cases} 255, & I(x, y) > (FLP(x) + BLP(x))/2 \\ I(x, y), & \text{otherwise} \end{cases}$$

In another words, each pixel with a pixel intensity value smaller than the average of the foreground and background profiles is left as is, while other pixels are changed so that they appear to have a maximum intensity. That is, they are changed to white. This kind of thresholding may be viewed as a process which classifies pixels as foreground or background based on their pixel values. If a pixel is classified as a foreground pixel its value is not modified, and if pixel is classified as a background pixel its value is changed to white.

More generally, in some implementations, instead of establishing the threshold as the average of the foreground and background profiles, some other parameter may be selected which is determined from the foreground and background profiles.

Figure 3:
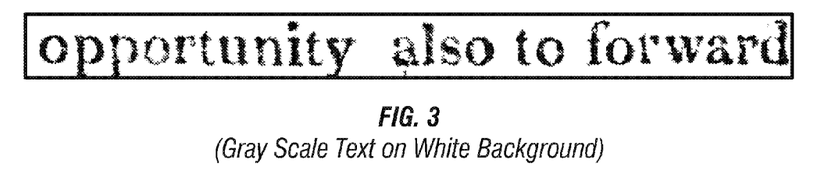
FIG. 3 shows a transformation of the textual line in FIG. 2 that is more suitable for OCR processing.
Figure 4:
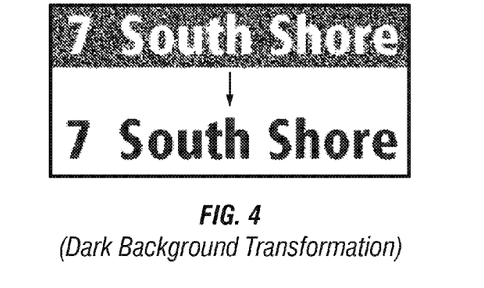
FIG. 4 shows an image transformation to ensure that the text is darker than the background.

The image depicted in FIG. 3 was obtained using the aforementioned thresholding technique. This technique produces very good results. However, its application on low quality images is not always satisfying and some text enhancement technique may be applied to such images, as discussed below.

Low Quality Text Enhancement

Figure 13:
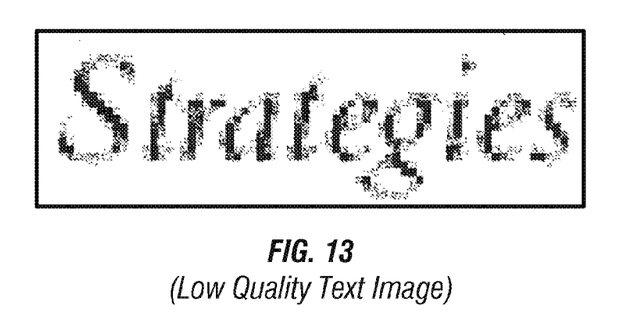
FIG. 13 shows an example of a low quality text image.
Figure 14:
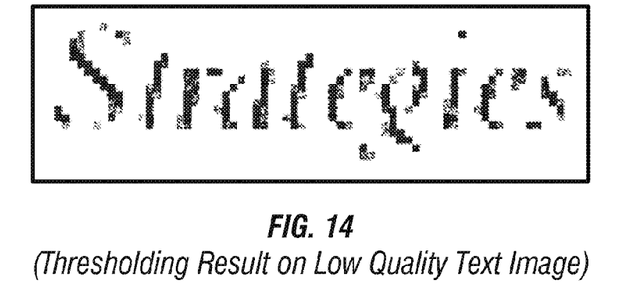
FIG. 14 shows the result of applying a thresholding procedure to the image shown in FIG. 13.

FIG. 13 shows an example of a low quality text image. The result of applying the aforementioned thresholding procedure on this image is shown in FIG. 14. Evidently the resulting image is of poor quality. Any subsequent processing steps are destined to make wrong decisions since the image is almost illegible even for a human. The reasons for the bad results are clear. The pixel values making up the text strokes in FIG. 13 have large variations. Some of them are even more similar to the background pixels than foreground pixels, and some noisy pixels have values similar to foreground pixel values. In addition, the stroke width is extremely small, resulting in little text integrity.

The thresholding procedure described above uses a fixed value for the threshold function that is halfway between the local background and foreground profiles. One approach to overcoming the problem concerning low quality textual images is to make the thresholding procedure more adaptive so that the threshold is adjustable for different images. Unfortunately, more context information is generally needed to effectively accomplish this. One alternative to the thresholding process involves detecting a low quality image using more intelligent (and more intensive) processing to provide better background filtering. Such an alternative process will be described after discussing how low quality textual images can be detected.

Low Quality Text Detection

The first step in detecting low quality textual images involves identifying those features that make such an image low in quality. As previously mentioned, such a textual image is characterized by a small stroke width and large textual color variation. If the stroke width were larger, the thresholding process described above would produce a "thinned" rendition of the characters, but they would still be legible. This is also true with respect to small color variations. It can be concluded that the key features of a low quality textual image are a small stroke width in combination with large color intensity variations.

Another thing to note is the result of the thresholding procedure depicted in FIG. 14. It is evident that this procedure yields strokes in parts of the characters which have a small width (typically less than couple of pixels). By calculating the median of the "stroke" widths on this image the text quality can be assessed.

The following definition is needed to describe a procedure for estimating the stroke width.

Definition 11. Let $cc=\{(x_1, y_1), \ldots, (x_n, y_n)\}$ be a connected component. Each $(x_i, y_i) \in cc$ such that there exists the $(x_j, y_j) \notin cc$ which belongs to 8-neighbors set of $(x_i, y_i)$ is called the edge pixel of cc.

Figure 15:
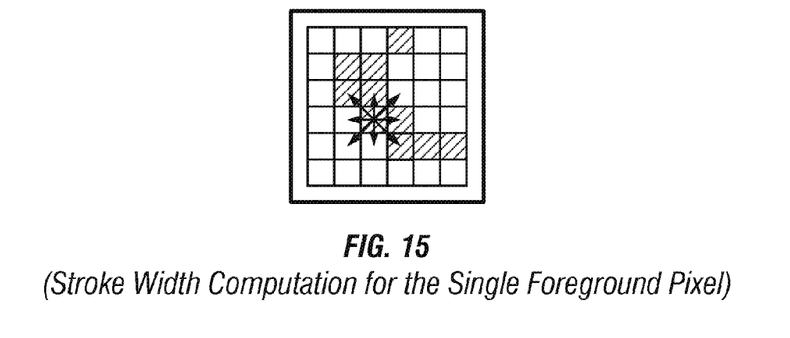
FIG. 15 shows the manner in which a local stroke width is determined for the single foreground pixel in which the arrows originate.

The stroke width estimation procedure begins by computing the local stroke width for every edge foreground pixel in FIG. 14. This may be accomplished by computing the stroke widths in all possible directions, as illustrated in FIG. 15 for the single foreground pixel in which the arrows originate.

Beginning at the selected foreground pixel, neighboring pixels in the 90 degree direction are examined. In the vertical direction there is a series of 3 continuous foreground pixels before reaching a background pixel. Similarly, there are 2 foreground pixels in the 0 degree direction, 1 foreground pixel in the 45 degree direction and 3 foreground pixels extending in the 135 degree direction. From among these four values the smallest (in this case 1) is selected as the local stroke width for the selected pixel. This same procedure is applied to all the edge pixels, thereby producing a set of local stroke widths. A good estimate of the overall stroke width of the text is the median of this set of values, which is denoted $SW_{or}$.

Once $SW_{or}$ is calculated all the necessary data is available to examine the quality of the text image. If $SW_{or}$ is smaller than some predefined threshold $SW_{tr}$ the image may be considered a low quality image. The choice of $SW_{tr}$ influences the rest of the process. As smaller values of $SW_{tr}$ are chosen, the fewer native line images will be deemed low quality. While this implies a smaller amount of subsequent processing, it also leaves some native line images unenhanced. On the other hand, if a greater value for $SW_{tr}$ is chosen, more native lines will be enhanced at the price of more processing power. In some implementations a suitable compromise value is in the range $SW_{tr} \in [2,4]$.

Once a low quality image is detected, a text enhancement method may be applied. Two illustrative methods for text enhancement will be described below. The first one is very accurate but expensive in terms of the required processing power, while the second one is more efficient but somewhat less accurate.

Accurate Text Enhancement

The images which are passed to a text enhancement component have a stroke width $SW_{or}$, which is smaller than some predefined threshold. This implies that there is only a small degree of freedom in processing. One way to overcome this problem is to perform image interpolation. Image interpolation is a technique for increasing the resolution of an image. Although a large number of interpolation techniques are available, one suitable example is bilinear interpolation, which is very simple yet sufficiently powerful to serve the needs of the text enhancement process.

Figures 16, 17:
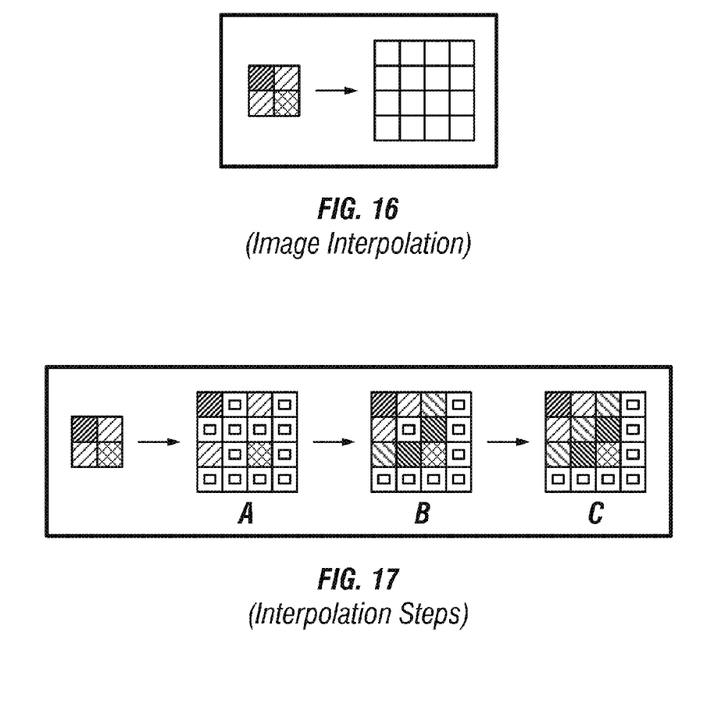
FIG. 16 shows a pixel being mapped to a set of four pixels in an image that is to be interpolated.
FIG. 17 illustrates the steps in the interpolation process.

Assume by way of example that an image is to be interpolated so that its resolution is increased by a factor of two in both (x and y) directions. This means that each pixel in the original image is mapped to a set of four pixels in the interpolated image. This process is illustrated in FIG. 16.

The first step in the bilinear interpolation process is to map the pixel values at the coordinates (x, y) in the original image to the coordinates (2x,2y) in output image. This process is depicted in FIG. 17a. The pixels that include a small shaded rectangle are pixels to which no is value assigned. In this way one fourth of the output pixels are assigned the proper pixel values. Note that mapping or copying yields some pixels in the output image which are located between two assigned pixels (these are the pixels which have at least one even coordinate). The value of these pixels may be computed as the average value assigned to their neighboring pixels (see FIG. 17b). At this point only pixels with odd coordinates in the output image remain unassigned. The values of these pixels may be computed as the average of all the pixel values of the pixels in its 4-neighbors set. This final step in the bilinear interpolation process yields the interpolated image (FIG. 17c). The final image in FIG. 17c has some pixels with no assigned values since their values depend on pixel values not shown in the figure.

Figure 18:
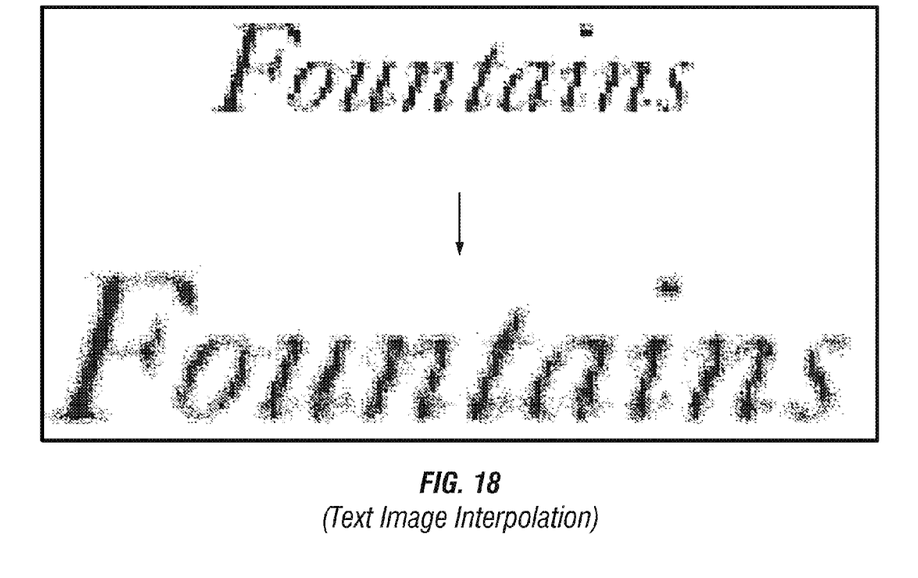
FIG. 18 illustrates the results of applying the interpolation process to the text image depicted in the upper portion of the figure.

The bottom portion of FIG. 18 shows the result of applying the interpolation process to the text image depicted in the upper portion of the figure.

One advantageous side effect that arises from applying image interpolation to a low quality text image is the inherently smoothing affect of the interpolation process. This yields an image with a smaller variance in text color intensity, which was one of the problems with low quality text.

At this point in the text enhancement process the following information is known about the interpolated image:

Background line profile BLP(x)
Foreground line profile FLP(x)
Stroke width $SW_{hr}=2*SW_{or}+1$ Since the thresholding algorithm produces an eroded version of the text, all pixel values smaller than (BLP(x)+FLP(x))/2 may be safely considered as part of the text and assigned a value of 0. Likewise, pixels having values greater than BLP(x) may be classified as background pixels and assigned a value of 255. However, pixels with values within the range from ((BLP(x)+FLP(x))/2 to BLP(x))=($L_1$(x), $L_2$(x)) are questionable in terms of classification, and some additional processing is needed to determine whether they belong to text or background.

To classify these pixels in a manageable and convenient manner the pixel color resolution can be divided into a finite number of intensity intervals n over the aforementioned indeterminate range using the equation $$I(x, y) = \begin{cases} I_1 = \Delta I, & I(x, y) \in (L_1(x), L_1(x) + \Delta L) \\ I_2 = 2\Delta I, & I(x, y) \in (L_1(x) + \Delta L, L_1(x) + 2\Delta L) \\ \ldots \\ I_{n-1} = (n-1)\Delta I, & I(x, y) \in (L_1(x) + (n-1)\Delta L, L_1(x) + n\Delta L) \end{cases}$$

where $\Delta I=255/n$ and $\Delta L=(L_2(x)-L_1(x))/n$.

The parameter that determines the size of the intensity intervals is n, which should be chosen to yield a small number of intensity intervals. In some implementations a good choice may be $n \in [3,5]$, for example. Decreasing the color resolution by dividing the intensity into n intervals can be used to enhance the quality of the text in a manner that will be described in connection with FIGS. 19 and 20.

Figure 19:
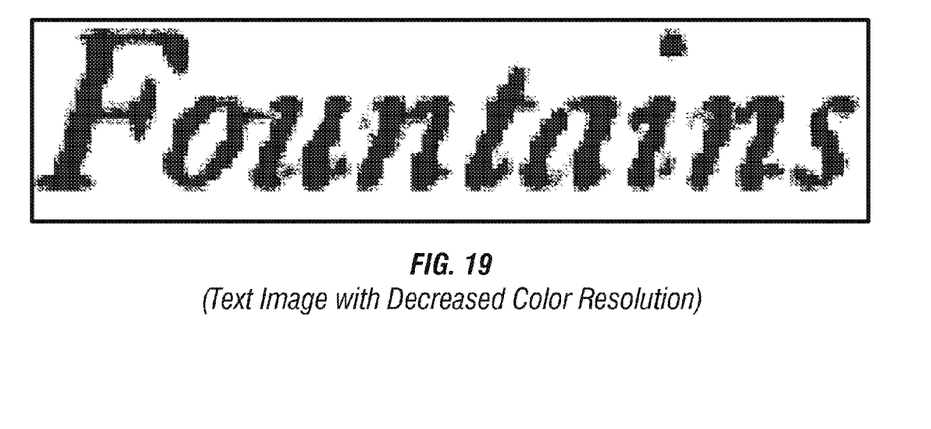
FIG. 19 illustrates a word to which the text enhancement process will be applied.
Figure 20:
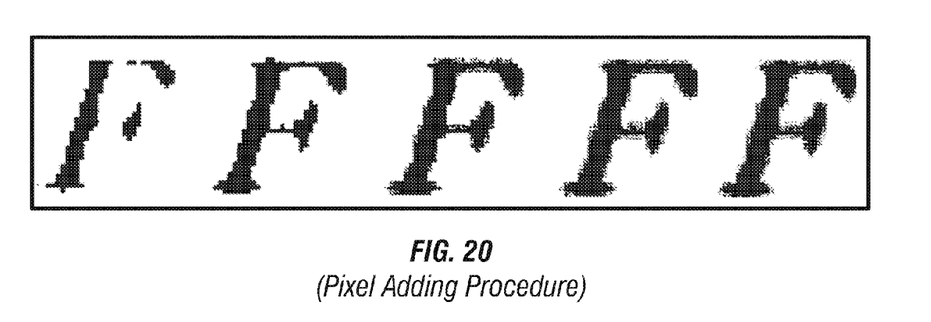
FIG. 20 depicts the text enhancement process by adding pixels to the first letter in the word shown in FIG. 20.

The text enhancement process will now be applied to the letter F in FIG. 19. FIG. 20 depicts the process by adding pixels to this letter. Pixels having an intensity within the first interval, $\Delta I$, are added to the leftmost letter in FIG. 20. Pixels having an intensity within the second interval, $\Delta I$, are added to the second letter from the left in FIG. 20. This process is repeated by adding pixels within each subsequently higher intensity interval to each subsequent letter in the figure.

FIG. 20 clearly illustrates the results of adding pixels in this manner. In particular, the letter F becomes more and more pronounced as pixels are added. While it is clear that this process may be used to enhance or reconstruct individual letters, problems arise when letters start "leaking" into the background or begin to touch one other. To prevent this, some kind of stopping criterion must be employed to determine when no additional pixels should be added. The following definition is useful in obtaining an appropriate stopping criterion.

Definition 12. Let cc be a connected component. A set of pixels belonging to a connected component which are equally distant from two different edge pixels of cc is called the skeleton of cc.

Figure 21:
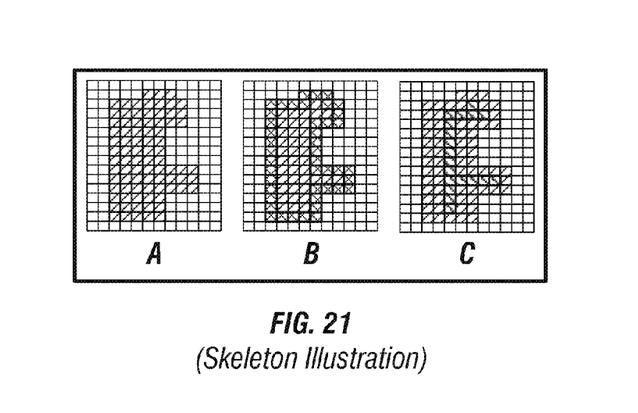

FIG. 21a shows an example of a connected component. The darker pixels in FIG. 21b are the edge pixels for this connected component and the cross-hatched pixels in FIG. 21c represent the skeleton of the connected component.

Figure 22:
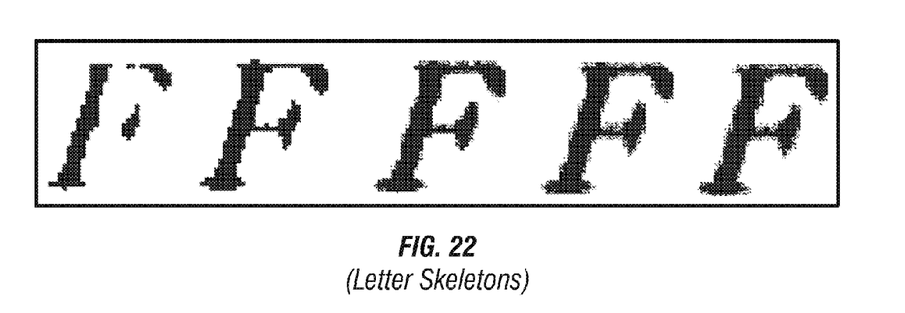
FIG. 22 shows the results of applying the pixel adding process of FIG. 20 to the skeletons of a connected component.

One thing to observe is that the pixel adding process has almost no impact on the skeletons. This can be seen in FIG. 22, which depicts the skeletons of the connected components corresponding to the pixel adding process of FIG. 20. At each pixel adding step the skeleton of the connected component remains almost the same. What does change is the distance between the skeleton pixels and the edge pixels. The more pixels that are added, the greater the distance becomes between the skeleton pixels and the edge pixels.

At this point it is important to recall that the stroke width $SW_{hr}$ of this connected component has already been calculated. It is a reasonable to require that the pixel adding process terminate when some small number of skeleton pixels exceed a distance of $SW_{hr}/2$ from the edge pixels. If this value were to be exceeded, the connected component would start to "leak" into the background. Accordingly, no more pixels should be added to letter at this point.

Bearing in mind the previous discussion, a text enhancement algorithm may be formulated as follows:

1) Interpolate a low quality text image in twice higher resolution.
2) Decrease the color resolution of the text image by defining a finite number of intensity intervals.
3) Identify all the connected components in the image which are formed only from the darkest pixels (e.g., those pixels with an intensity of zero). These connected components will be referred to as base connected components.
4) For each base connected component perform the following steps:
   a. Calculate the skeleton of the connected component.
   b. If the pixels in the skeleton are less than a distance $SW_{hr}/2$ from the edge pixels, create a new connected component by adding to the current connected component neighboring pixels belonging to the next intensity interval (current I+ΔI).
   c. Repeat steps a and b until the stopping criterion is met. That is, the process stops when there are skeleton pixels that are more than a distance of $SW_{hr}/2$ from the edge pixels.

Figure 23:
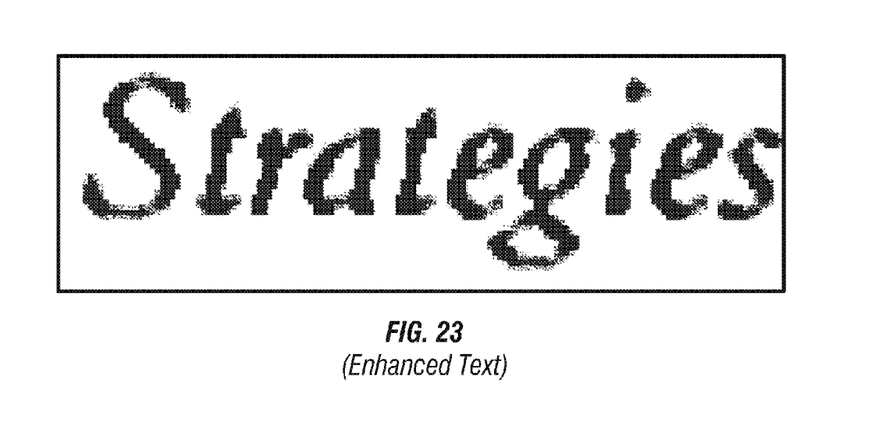
FIG. 23 shows the results of applying the text enhancement process to the image depicted in FIG. 13.

Once all the base connected components are processed in this manner the text enhancement process is finished. The result of applying this process to the image depicted in FIG. 13 is illustrated in FIG. 23.

Efficient Text Enhancement

The previously described algorithm for enhancing the textual image using stroke recovery can often provide very good results. One drawback, however, is its computational complexity. In this section one variant of the algorithm which is less expensive (in terms of processing power), but with comparable quality will be described.

As in the previous approach, this approach performs image interpolation and divides the color resolution into a finite number of intervals in the manner described above. However, the algorithm described in the previous section is time consuming because of the recursive process applied to the base connected components, which involves calculation of the skeleton. Since the skeletons are an integral part of the stopping criterion, some other variant of stopping criterion may be employed to reduce the computational complexity of the algorithm. One approach is described below.

After decreasing the color resolution a small set of colors is left. All pixels having an intensity of 255 (white pixels) are considered to be part of the background. All pixels with intensity of 0 (black pixels) are considered to be text pixels. It is the gray pixels which are questionable. Referring again to FIG. 19, one way to avoid the need to perform an exact calculation of the skeleton while obtaining an estimate of it is to find (for each gray pixel) the maximal rectangle, centered at that pixel, that is made up completely of non-white pixels. Let $a(x, y)$ be the dimension of the rectangle for the pixel $I(x, y)$. All the pixels having a rectangle that satisfies $a(x, y) \geq SW_{hr}$ are almost certainly part of the text or a flat noisy area in the background. This set is denoted as $A=\{(x_1, y_1), (x_j, y_j)\}$. Now, all the pixels $(x_k, y_k) \notin A$ such that $\forall (x_l, y_l), d((x_k, y_k),(x_l, y_l)) \leq SW_{hr}$ where $d((x_k, y_k),(x_l, y_l))=\min(|x_k-x_l|,|y_k-y_l|)$ are added to the set. In another words, all the pixels from the vicinity of the pixels inside set A are added, which is an alternative to the pixel adding procedure in the algorithm described above. To ensure than no "leaking" into the background occurs the set A may undergo filtering. In this way pixels from the set can be eliminated if their distance from the closest edge is greater than $SW_{hr}$. This way the flat noisy areas are eliminated from the text.

This algorithm is similar to the more accurate algorithm described above. However, instead of performing a recursive calculation before each set of pixels within an interval are added, a one-step approximation is applied, resulting in smaller amount of processing time. The results achieved by of applying this algorithm on a low quality text image have been found to be similar to the results achieved by applying the accurate algorithm, which are depicted in FIG. 23.

Figure 24:
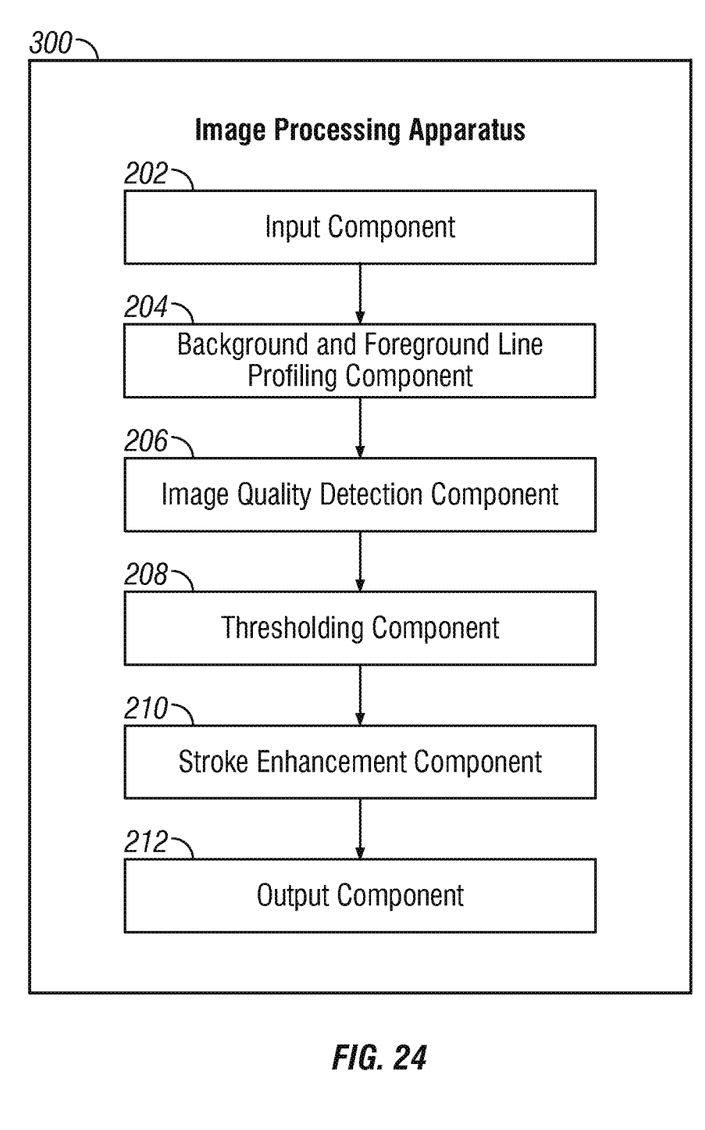
FIG. 24 shows one example of an image processing apparatus that may perform text enhancement on a textual image undergoing optical character recognition.

FIG. 24 shows one example of an image processing apparatus 300 that may perform the text enhancement process described above on a textual image undergoing optical character recognition. The apparatus, which may be incorporated in an OCR engine, includes an input component 202 for receiving an input image having native lines of text. The apparatus also includes a background and foreground line profiling component 204, an image quality detection component 206, a thresholding component 208 and a stroke enhancement component 210. An output component 212 generates the enhanced image as an output, which may be employed by subsequent components of the OCR engine.

Figure 25:
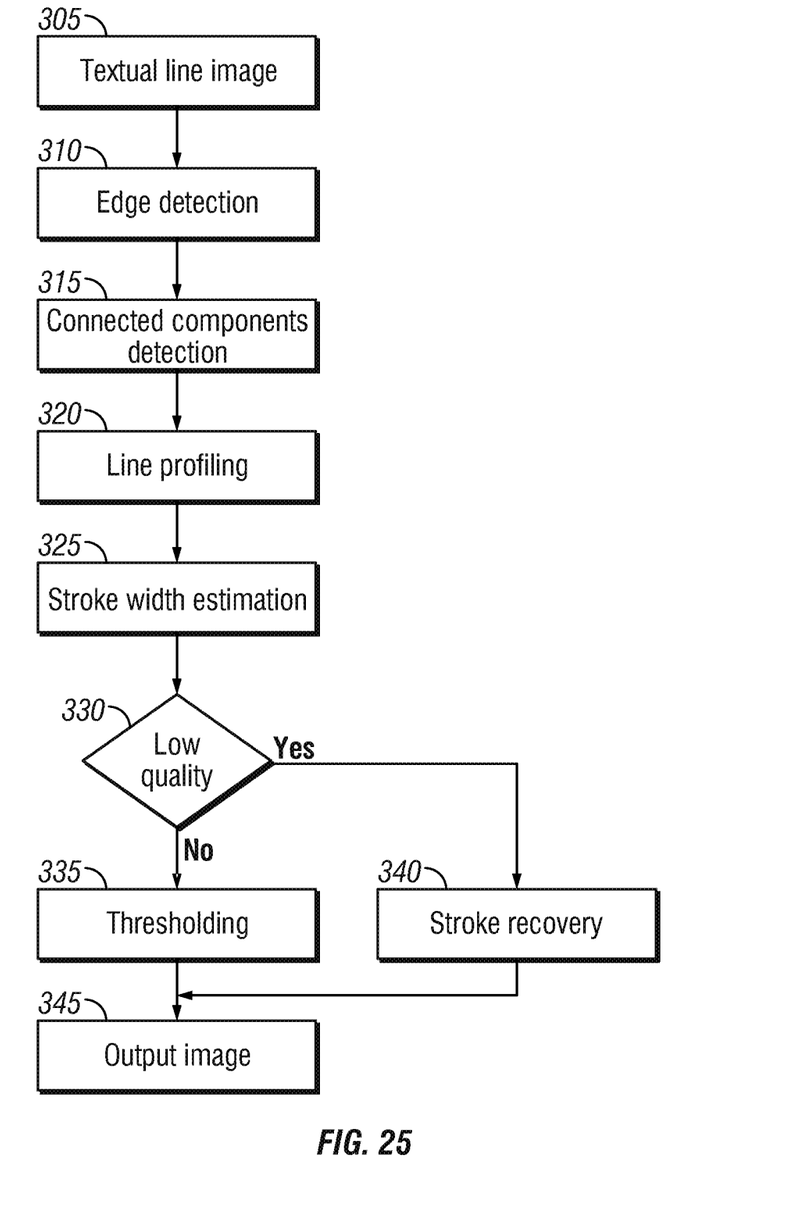
FIG. 25 is a flowchart showing one example of an overall method for enhancing a textual image that is to undergo optical character recognition.

FIG. 25 is a flowchart showing one example of an overall method for enhancing a textual image that is to undergo optical character recognition. The method may be implemented by the image processing apparatus shown in FIG. 24. The method begins in step 305 when an image of native lines of text are received by the input component 202. The line profiling component 204 then performs edge detection on the native lines in step 310 to produce a representation of the native lines in edge space. In step 315, the line profiling component 204 next identifies each connected component arising in the representation of the native lines in edge space. Using the information obtained in steps 310 and 315, the line profiling component 204 determines in step 320 the background and foreground line profiles in the manner described above. Once the line profiles have been determined, the image quality detection component 206 determines in step 325 if the quality of the image is sufficient to assign pixels to the background or foreground portion of the image based on the line profiles. As described above, one criterion that may be used to determine image quality is the stroke width of the connected components. If the image quality is found in decision step 330 to be sufficiently high, the pixels are assigned to either the foreground or background portion of the image by the thresholding component 208 in step 335. If, on the other hand, the image quality is not sufficiently high, image enhancement is performed by the stroke enhancement component 210 in step 340 to enhance the strokes of the connected components. Finally, the output component 212 generates in step 345 the enhanced image, which may be employed by subsequent components of the OCR engine.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for enhancing a textual image for undergoing optical character recognition, comprising:
receiving an image that includes native lines of text;
determining a background line profile that represents an average background intensity along the native lines in the image;
determining a foreground line profile that represents an average foreground background intensity along the native lines in the image;
assigning pixels in the image to either a background or foreground portion of the image based at least in part on the background line profile and the foreground line profile; and
adjusting an intensity of the pixels designated to the background portion of the image to a prescribed intensity representing a portion of the image that does not include text
representing the native lines of text in edge space, detecting connected components in the native lines represented in edge space, and wherein determining the background and foreground line profiles includes determining a plurality of background and foreground intensity values for a plurality of localized regions along each of the native lines represented in edge space.

2. The method of claim 1 wherein assigning the pixels further comprises:
assigning pixels in the image having an intensity less than a selected parameter to a foreground portion of the image, wherein the selected parameter is determined at least in part from the background line profile and the foreground line profile; and
assigning pixels in the image having an intensity greater than the selected parameter to a background portion of the image.

3. The method of claim 2 wherein the selected parameter is an average of the background line profile and the foreground line profile.

4. The method of claim 2 wherein the selected parameter is adjustable.

5. The method of claim 1 further comprising estimating an average or median stroke width of connected components representing text in the image.

6. The method of claim 1 wherein determining the plurality of background and foreground intensity values for the plurality of localized regions further comprises: for each localized region, preparing a histogram of intensity values of pixels within bounding boxes that each encompass a connected component located in the respective localized region, wherein the histogram has a dominant peak that includes pixels having an intensity within a defined range; and for each bounding box, assigning pixels having intensity values within the defined range to the background intensity values and assigning remaining pixels to the foreground intensity values.

7. The method of claim 1 wherein the localized regions have a height about equal to a height of the native lines and a width less than a predetermined multiple of the height of the native line.

8. A method for enhancing a textual image for undergoing optical character recognition, comprising:
receiving an image that includes native lines of text;
determining a background line profile that represents an average background intensity along the native lines in the image;
determining a foreground line profile that represents an average background intensity along the native lines in the image;
estimating an average or median stroke width of connected components representing text in the image;
enhancing text quality if the average or median stroke width is less than a threshold value, the enhancing comprising:
assigning pixels in the image having an intensity less than a selected parameter to a foreground portion of the image, wherein the selected parameter is determined at least in part from the background line profile and the foreground line profile;

assigning pixels in the image having an intensity greater than the background line profile to the background portion of the image; and assigning selected pixels having an intensity between the selected parameter and the background line profile to base connected components of the native lines represented in edge space.

9. The method of claim 8 further comprising estimating an average or median stroke width of the connected components representing text in the image by determining a local stroke width for each pixel assigned to the foreground intensity values and enhancing text quality if the average or median stroke width is less than a threshold value.

10. The method of claim 8 wherein enhancing text quality includes performing image interpolation to increase image resolution.

11. The method of claim 10 wherein the image interpolation is bilinear interpolation that maps each pixel in the image to a set of at least two pixels.

12. The method of claim 8 wherein assigning selected pixels having an intensity between the selected parameter and the background line profile is performed by incrementally adding sets of pixels within increasingly higher intensities, wherein each set defines pixels having an intensity within one of a finite set of intensity intervals.

13. The method of claim 12 further comprising terminating assigning selected pixels to at least one of the base connected components when a distance between an edge pixel and a skeleton pixel of the base connected component is greater than half the average or median stroke width.

14. A system comprising a processor and storage, wherein the system enhances a textual image undergoing optical character recognition, comprising:

an input component stored in the storage and executed by the processor that receives an input image having native lines of text;

a background and foreground line profiling stored in the storage and executed by the processor component that determines background and foreground line profiles which respectively represent average background and foreground intensities in the image;

an image quality detection component stored in the storage and executed by the processor that determines, based on an average or median stroke width and on variation in the background and foreground intensities, if a quality of the image satisfies a threshold value;

a thresholding component stored in the storage and executed by the processor that assigns pixels to either a background or foreground portion of the image based on the background and foreground line profiles; and a stroke enhancement component stored in the storage and executed by the processor that enhances strokes of connected components representing text in the image if the image quality detection component determines that the quality of the image satisfies the threshold value.

15. The system of claim 14 wherein the image quality detection component determines the quality of the image by estimating an average or median stroke width of the connected components representing text in the image and comparing the average or median stroke width to the threshold value.

16. The system of claim 14 wherein the background and foreground line profile component is further configured to determine a plurality of background and foreground intensity values for a plurality of localized regions along each of the native lines represented in edge space, wherein each localized region has dimensions less than or equal to predefined values.

17. The system of claim 16 wherein the background and foreground line profile component is further configured to determine the plurality of background and foreground intensity values for the plurality of localized regions by:

for each localized region, preparing a histogram of intensity values of pixels within bounding boxes that each encompass a connected component located in the respective localized region, wherein the histogram has a dominant peak that includes pixels having an intensity within a defined range; and for each bounding box, assigning pixels having intensity values within the defined range to the background intensity values and assigning remaining pixels to the foreground intensity values.

* * * * *